[I] US010578088B2

(12) United States Patent
Ki et al.

(10) Patent No.: US 10,578,088 B2
(45) Date of Patent: Mar. 3, 2020

(54) RECIPROCATING COMPRESSOR HAVING SUPPORT SPRINGS OF DIFFERENT NATURAL FREQUENCIES

(71) Applicant: LG ELECTRONICS INC., Seoul (KR)

(72) Inventors: Sunghyun Ki, Seoul (KR); Sangmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 15/107,183

(22) PCT Filed: Dec. 1, 2014

(86) PCT No.: PCT/KR2014/011651
§ 371 (c)(1),
(2) Date: Jun. 22, 2016

(87) PCT Pub. No.: WO2015/099306
PCT Pub. Date: Jul. 2, 2015

(65) Prior Publication Data
US 2017/0016436 A1 Jan. 19, 2017

(30) Foreign Application Priority Data
Dec. 27, 2013 (KR) .................. 10-2013-0166066

(51) Int. Cl.
*F04B 35/04* (2006.01)
*F04B 53/00* (2006.01)
(Continued)

(52) U.S. Cl.
CPC ............ *F04B 35/045* (2013.01); *F04B 17/04* (2013.01); *F04B 39/0044* (2013.01);
(Continued)

(58) Field of Classification Search
CPC .... F04B 35/04; F04B 35/045; F04B 39/0044; F04B 17/04–17/048; F04B 39/12;
(Continued)

(56) References Cited

U.S. PATENT DOCUMENTS 6,089,836 A * 7/2000 Seo ..................... F04B 39/0005
417/415
6,209,328 B1 * 4/2001 Kim ..................... F04B 35/045
310/13
(Continued)

FOREIGN PATENT DOCUMENTS

CN  1399069  2/2003
CN  1673532  9/2005
(Continued)

OTHER PUBLICATIONS

Chinese Office Action dated Feb. 4, 2017 issued in Application No. 201480070124.5 (with English translation).
(Continued)

*Primary Examiner* — Bryan M Lettman
(74) *Attorney, Agent, or Firm* — KED & Associates LLP

(57) ABSTRACT

Natural frequencies of a front side support spring and a rear side support spring of a reciprocating compressor are formed to be different such that a natural frequency of one support spring is lower than an operating frequency and a natural frequency of the other support spring is higher than the operating frequency. Both support springs may resonate in mutually opposite directions to form an antiphase, and thus, compressor vibrations may be effectively reduced without reducing a stiffness of both support springs.

21 Claims, 7 Drawing Sheets

(51) Int. Cl.
*F04B 17/04* (2006.01)
*F04B 39/12* (2006.01)
*F04B 39/00* (2006.01)
*F04B 53/16* (2006.01)

(52) U.S. Cl.
CPC .......... *F04B 39/121* (2013.01); *F04B 39/127* (2013.01); *F04B 53/003* (2013.01); *F04B 53/16* (2013.01)

(58) Field of Classification Search
CPC .... F04B 39/121; F04B 39/122; F04B 39/127; F04B 39/14; F04B 53/003; F04B 53/16
See application file for complete search history.

(56) References Cited

U.S. PATENT DOCUMENTS

| | | | |
|---|---|---|---|
| 2005/0158193 A1* | 7/2005 | Roke | F04B 35/045 417/417 |
| 2007/0020121 A1* | 1/2007 | Halkyard | F04B 35/045 417/363 |

FOREIGN PATENT DOCUMENTS

| | | |
|---|---|---|
| CN | 101835976 | 9/2010 |
| GB | 1222425 | 2/1971 |
| JP | 2002-242831 A | 8/2002 |
| JP | 2004-522051 | 7/2004 |
| KR | 10-1999-0065327 A | 8/1999 |
| KR | 10-2002-0068751 | 8/2002 |
| KR | 10-0469457 | 2/2005 |
| KR | 10-2007-0103252 A | 10/2007 |
| KR | 10-2012-0005860 A | 1/2012 |
| KR | 10-1332556 B1 | 11/2013 |

OTHER PUBLICATIONS

International Search Report dated Mar. 24, 2015 issued in Application No. PCT/KR2014/011651.
Korean Office Action dated Dec. 20, 2019 issued in Application No. 10-2013-0166066.

* cited by examiner

RECIPROCATING COMPRESSOR HAVING SUPPORT SPRINGS OF DIFFERENT NATURAL FREQUENCIES

CROSS-REFERENCE TO RELATED PATENT APPLICATIONS

This application is a U.S. National Stage Application under 35 U.S.C. § 371 of PCT Application No. PCT/KR2014/011651, filed Dec. 1, 2014, which claims priority to Korean Patent Application No. 10-2013-0166066, filed Dec. 27, 2013.

TECHNICAL FIELD

The present disclosure relates to a reciprocating compressor and, more particularly, to a support spring of a reciprocating compressor.

BACKGROUND ART

In general, a reciprocating compressor is a compressor in which a piston linearly reciprocates within a cylinder to suck, compress, and discharge a refrigerant. The reciprocating compressor may be classified as a connection type reciprocating compressor and a vibration type reciprocating compressor according to a driving scheme of a piston forming a part of a compression mechanism unit.

In the connection type reciprocating compressor, a piston is connected to a rotational shaft of a rotary motor by a connecting rod and reciprocates within a cylinder to compress a refrigerant. Meanwhile, in the vibration type reciprocating compressor, a piston is connected to a mover of a reciprocating motor, so as to vibrate and reciprocate within a cylinder to compress a refrigerant. The present invention relates to a vibration type reciprocating compressor, and hereinafter, the vibration type linear compressor will be simply referred to as a reciprocating compressor.

The reciprocating compressor may be classified as a fixed type reciprocating compressor in which a frame supporting a stator of a reciprocating motor and a cylinder of a compression mechanism unit is fixed to an inner circumferential surface of a shell and a movable reciprocating compressor in which a frame is spaced apart from an inner circumferential surface of a shell.

In the fixed type reciprocating compressor, vibrations transmitted from the exterior of the shell or vibrations generated in the interior of the shell are directly transmitted to the interior of the shell or the exterior of the shell, increasing vibration noise of the compressor.

In contrast, in the movable reciprocating compressor, a support spring is installed between a shell and a compression mechanism unit, and thus, vibrations transmitted from the exterior of the shell or vibrations generated in the interior of the shell are absorbed by the support spring, rather than being directly transmitted to the interior or exterior of the shell, attenuating vibration noise of the compressor.

FIG. 1 is a cross-sectional view illustrating an example of a related art movable reciprocating compressor.

As illustrated, in the related art reciprocating compressor, a compressing unit C that compresses a refrigerator in an internal space 11 of an airtight shell 10 is elastically supported by a plurality of support springs 61 and 62.

The compressing unit C includes a reciprocating motor 30 installed in the internal space 11 of the shell 10 in which a mover 32 reciprocates and a compressor mechanism unit in which a piston 42 is coupled to the mover 32 of the reciprocating motor 30 and reciprocates in a cylinder 41 to compress a refrigerant.

The support springs 61 and 62 are formed as plate springs having an identical natural frequency and installed between the compressing unit C and an inner circumferential surface of the shell 10.

Reference numeral 12 denotes a suction pipe, reference numeral 13 denotes a discharge pipe, reference numeral 20 denotes a frame, reference numeral 31 denotes a stator, reference numeral 31a denotes stator blocks, reference numeral 31b denotes pole blocks, reference numeral 35 denotes a coil, reference numeral 32a denotes a magnet holder, reference numeral 32b denotes a magnet, reference numeral 43 denotes a suction valve, reference numeral 44 denotes a discharge valve, reference numeral 45 denotes a valve spring, reference numeral 46 denotes a discharge cover, reference numerals 51 and 52 denote resonance springs, reference numeral 53 denotes a support bracket supporting the resonance springs, reference numeral 70 denotes a gas bearing, reference letter F denotes a suction flow path, reference numeral S1 denotes a compression space, and reference numeral S2 denotes a discharge space.

In the related art reciprocating compressor as mentioned above, when power is applied to the reciprocating motor 30, the mover 32 of the reciprocating motor 30 reciprocates with respect to the stator 31. Then, the piston 42 coupled to the mover 32 linearly reciprocates within the cylinder 41 to suck, compress, and subsequently discharge a refrigerant.

Here, the compressing unit C including the reciprocating motor 30 and the compression mechanism unit is elastically supported by the support springs 61 and 62 with respect to the shell 10, absorb vibrations transmitted from the exterior of the shell 10 and vibrations generated in the interior of the shell 10 to attenuate vibration noise of the compressor.

DISCLOSURE OF INVENTION

Technical Problem

However, in the related art reciprocating compressor, as illustrated in FIG. 2, since both of the front side and rear side support springs 61 and 62 have an identical natural frequency, when the compressing unit C vibrates in a forward/backward direction, the front side support spring 61 and the rear side support spring 62 resonate in an identical direction, namely, in the opposite direction of the compressing unit, attenuating vibrations of the compressor. However, as the front side support spring 61 and the rear side support spring 62 resonate in an identical direction, excitation force is generated, having a limitation in attenuation of vibrations of the compressing unit.

FIG. 3 is a graph illustrating a curve of a vibration transmission rate representing shell vibrations in a reciprocating compressor when the front side support spring and the rear side support spring have an identical natural frequency, and FIG. 4 is a graph illustrating phase angles with respect to the front side support spring and the rear side support spring. Referring to the curve of the vibration transmission rate of the support springs with reference to FIG. 3, it can be seen that natural frequencies of both support springs 61 and 62 overlap to generate a peak point, and the curve, passing through an actual operating frequency region, gently rises toward a next peak point. This is because, as illustrated in FIG. 4, both support springs 61 and 62, having an identical phase angle, vibrate together with the compressing unit. Thus, if both support springs 61 and 62 are designed to have very low stiffness and the natural frequency is desired to be distant from the operating frequency, secondary vibrations and noise generated as excitation force by the compressing unit C is transmitted to the shell 10 through the support springs 61 and 62 can be reduced. In this case, however, since stiffness of the support springs 61 and 62 is so low that the support springs are deformed in a horizontal direction (namely, in the radial direction or in a vertical direction), and accordingly, the compressing unit C sags, making a behavior of the vibration part unstable to cause frictional loss or wear between the vibration part and the fixed part.

Solution to Problem

Therefore, an aspect of the detailed description is to provide a reciprocating compressor capable of reducing secondary vibrations and noise through support springs, while having a high level of stiffness sufficient for a compressing unit not to sag.

To achieve these and other advantages and in accordance with the purpose of this specification, as embodied and broadly described herein, a reciprocating compressor includes: a shell having an internal space; a compressing unit installed in the internal space of the shell, having a reciprocating motor with a mover that reciprocates, and having a vibration part that reciprocates together with the mover of the reciprocating motor, and configured to compress a refrigerator as the vibration part reciprocates in a compression space of a fixed part; and a plurality of support springs configured to support both sides of the compressing unit in a reciprocating direction with respect to the shell, wherein the plurality of support springs have different natural frequencies.

The plurality of support springs may include a first support spring installed at one side of the compressing unit in a vibration direction based on the compressing unit and a second support spring installed at the other side of the compressing unit in the vibration direction based on the compressing unit, wherein when a natural frequency of the first support spring is $F_{s1}$, a natural frequency of the second support spring is $F_{s2}$, and an operating frequency of the compressing unit is $F_e$, a relational expression $F_{s1} < F_e < F_{s2}$ may be satisfied.

The first support spring and the second support spring may have identical stiffness.

Among the first support spring and the second support spring, a natural frequency of a support spring close to the center of gravity of the compressing unit may be smaller than a natural frequency of a support spring distant from the center of gravity of the compressing unit.

Among the first support spring and the second support spring, a natural frequency of a support spring close to the compression space may be smaller than a natural frequency of a support spring distant from the compression space.

The compression mechanism unit may be formed such that a piston is slidably inserted into a cylinder forming the compression space, and a fluid bearing may be provided in the cylinder and configured to supply a refrigerant discharged from the compression space to a gap between the cylinder and the piston to support the piston with respect to the cylinder.

To achieve these and other advantages and in accordance with the purpose of this specification, as embodied and broadly described herein, a reciprocating compressor includes: a shell having an internal space; a compressing unit installed in the internal space of the shell and configured to reciprocate with a predetermined operating frequency to compress a refrigerant; and a first support spring and a second support spring installed in front and rear portions of the compressing unit based on the compressing unit and configured to elastically support the compressing unit with respect to the shell, with a natural frequency, respectively, wherein the first support spring and the second support spring have a section in which a phase of a resonance frequency of the first support spring and a phase of a resonance frequency of the second support spring are opposite.

The first support spring and the second support spring have a section in which a resonant mode of the first support spring and a resonant mode of the second support spring do not overlap with harmonic of the operating frequency is provided.

The first support spring and the second support spring may be configured as plate springs.

The first support spring may be configured as a plate spring and the second support spring may be configured as a coil spring.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Advantageous Effects of Invention

According to the reciprocating compressor of the present disclosure, natural frequencies of the front side support spring and the rear side support spring are formed to be different such that a natural frequency of one support spring is lower than the operating frequency and a natural frequency of the other support spring is higher than the operating frequency, whereby both support springs can resonate in the mutually opposite directions to form an antiphase, and thus, compressor vibrations can be effectively reduced without reducing stiffness of both support springs.

BRIEF DESCRIPTION OF DRAWINGS

The accompanying drawings, which are included to provide a further understanding of the invention and are incorporated in and constitute a part of this specification, illustrate exemplary embodiments and together with the description serve to explain the principles of the invention.

In the drawings.

BEST MODE FOR CARRYING OUT THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a reciprocating compressor according to embodiments of the present disclosure will be described with reference to the accompanying drawings.

Figure 5:
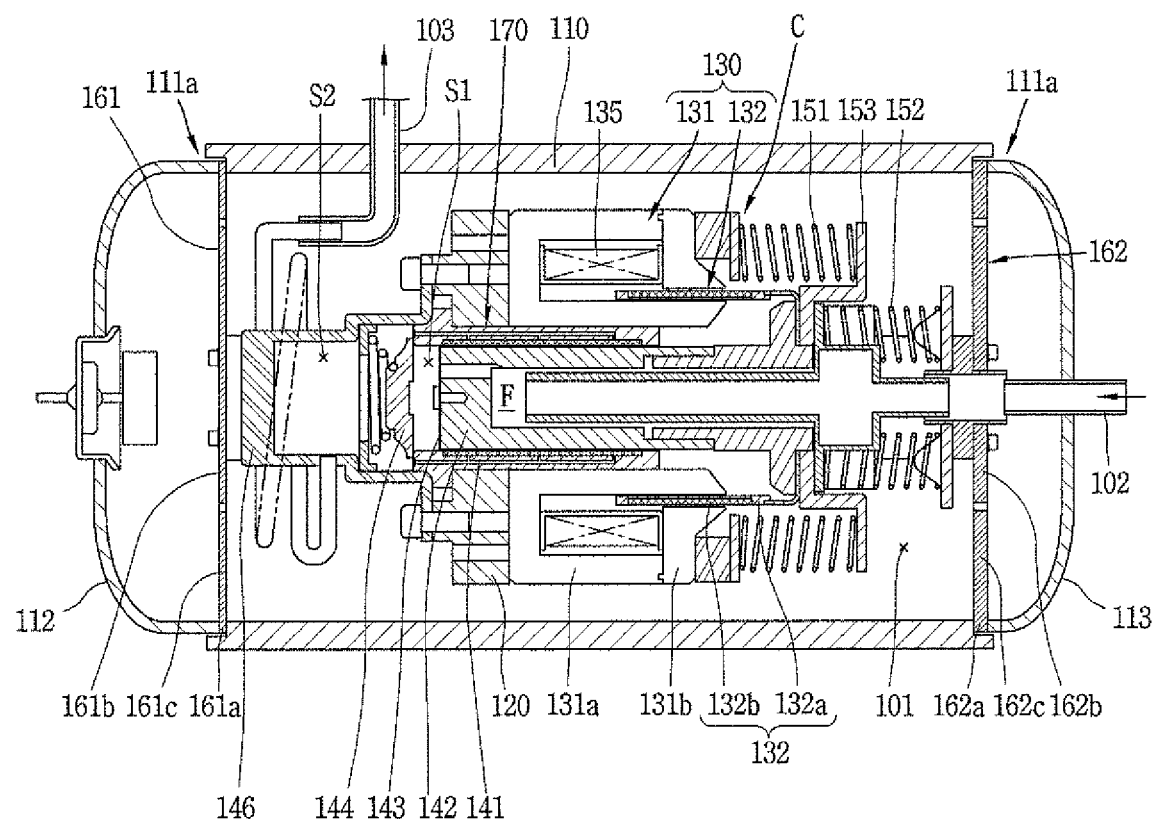
FIG. 5 is a cross-sectional view illustrating an example of a reciprocating compressor according to an exemplary embodiment of the present disclosure.

FIG. 5 is a cross-sectional view illustrating a reciprocating compressor according to an embodiment of the present disclosure. For reference, in FIG. 5, thicknesses of a first support spring and a second support spring are illustrated as being different to express a natural frequency (to be described hereinafter) for the purposes of description, and in actuality, the first support spring and the second support spring may have an identical thickness.

As illustrated in FIG. 5, in the reciprocating compressor according to an embodiment of the present disclosure, a frame 120 may be installed in the interior of a hermetically closed shell 110, and a stator 131 of a reciprocating motor 130 may be installed in the frame 120.

In the reciprocating motor 130, a coil 135 may be insertedly coupled to a stator 131, and an air gap may be formed only at one side based on the coil 135. Here, however, the gap may be formed on both sides of the coil 135. A mover 132 may include a magnet 132b which is inserted in the air gap of the stator 131 and reciprocates in a movement direction of a piston.

The stator 131 may include a plurality of stator blocks 131a and a plurality of pole blocks 131b respectively coupled to one sides of the stator blocks 131a to form an air gap portion (no reference numeral given) together with the stator blocks 131a.

The stator blocks 131a and the pole blocks 131b may be formed by laminating a plurality of thin stator cores one upon another, so that, when projected in an axial direction, the stator blocks 131a and the pole blocks 131b may have a circular arc shape. The stator blocks 131a may have a recess (⊏) shape when projected in the axial direction, and the pole block 131b may have a rectangular shape (|) shape when projected in the axial direction.

The mover 132 may include a magnet holder 132a and a plurality of magnets 132b coupled to an outer circumferential surface of the magnet holder 132a in a circumferential direction and forming magnetic flux together with the coil 135.

Preferably, the magnet holder 132a is formed of a non-magnetic material to prevent leakage of magnetic flux, but the present disclosure is not limited thereto and the magnet holder 132a may be formed of a magnetic material. An outer circumferential surface of the magnet holder 132a may have a circular shape to allow the magnets 132b to be attached thereto in a line contact manner. A magnet installation recess (not shown) may be formed in a band shape on an outer circumferential surface of the magnet holder 132a to allow the magnets 132b to be inserted therein and supported in a movement direction.

The magnets 132b may have a hexahedral shape and attached to the outer circumferential surface of the magnet holder 132a individually. When the magnet 132b is attached to the outer circumferential surface of the magnet holder 132a individually, the outer circumferential surfaces of the magnet 132b may be fixedly covered by a support member (not shown) such as a separate fixing ring, a tape formed of a composite material, and the like.

The magnets 132b may be continuously attached to the outer circumferential surface of the magnet holder 132a in a circumferential direction. Alternatively, the stator 131 may include a plurality of stator blocks 131a, the plurality of stator blocks 131a may be arranged to be spaced apart from one another by a predetermined gap in the circumferential direction, the magnets 132b may also be attached at a predetermined gap, namely, a gap equal to the gap between the stator blocks, in a circumferential direction on the outer circumferential surface of the magnet holder 132a, in order to minimize the usage of the magnets 132b.

In order to ensure a stable reciprocating movement, the magnet 132b may be formed such that a length thereof in a movement direction is not smaller than a length of an air gap portion in the movement direction, specifically, greater than the length of the air gap portion in the movement direction, and disposed such that at least one end of the magnet 132b in the movement direction is positioned within the air gap portion at an initial position or during an operation.

Only one magnet may be disposed in the movement direction and, according to circumstances, a plurality of magnets may be disposed in the movement direction. The magnet 132b may be disposed such that an N pole and an S pole correspond in the movement direction.

In the reciprocating motor 130, the stator 131 may have a single air gap portion or, according to circumstances, the stator 131 may have air gap portions (not shown) on both sides thereof in a reciprocating direction based on the coil. Also, in this case, the mover may be formed in the same manner as that of the foregoing embodiment.

Meanwhile, a cylinder 141 forming the compression mechanism unit together with the stator 131 of the reciprocating motor 130 is fixed to the frame 130, and a piston 142 forming the compression mechanism unit and coupled to the mover 132 of the reciprocating motor 130 may be inserted into and coupled to the cylinder 141 such that the piston 142 reciprocates therein. Resonance springs 151 and 152 forming the compression mechanism unit and inducing the piston 142 to make a resonant movement may be installed on both sides of the piston 142 in the movement direction, respectively.

A compression space S1 may be formed in the cylinder 141, a suction flow path F may be formed in the piston 142, a suction valve 143 for opening and closing the suction flow path F may be installed at an end of the suction flow path F, a discharge valve 144 forming the compression mechanism unit and opening and closing the compression space S1 of the cylinder 141 may be installed in a front end surface of the cylinder 141, and a discharge cover 146 forming the compression mechanism unit, fixing the cylinder 141 to the frame 120, and accommodating the discharge valve 144 may be coupled to the frame 120.

A fluid bearing 170 may be formed in the cylinder 141. The fluid bearing 170 may include a plurality of rows of gas holes (not shown) penetrating from a front end surface of the cylinder to an inner circumferential surface thereof. The fluid bearing 170 may have any structure as long as it guides a refrigerant discharged to the discharge cover, to between the cylinder and the piston to support the cylinder and the piston.

Meanwhile, a front side support spring (hereinafter, referred to as a first support spring) 161 supporting the compressing unit C in a horizontal direction (in a forward/backward direction or in a direction of a reciprocating movement) may be installed between the discharge cover 146 and a front side of the shell 110 corresponding thereto, and a rear side support spring (hereinafter, referred to as a second support spring) 162 supporting the compressing unit C in the horizontal direction (in the forward/backward direction or in the direction of a reciprocating movement) may be installed between the resonance spring, specifically, the spring bracket 153 supporting the resonance spring, and the rear side of the shell 110 corresponding thereto.

Figure 6:
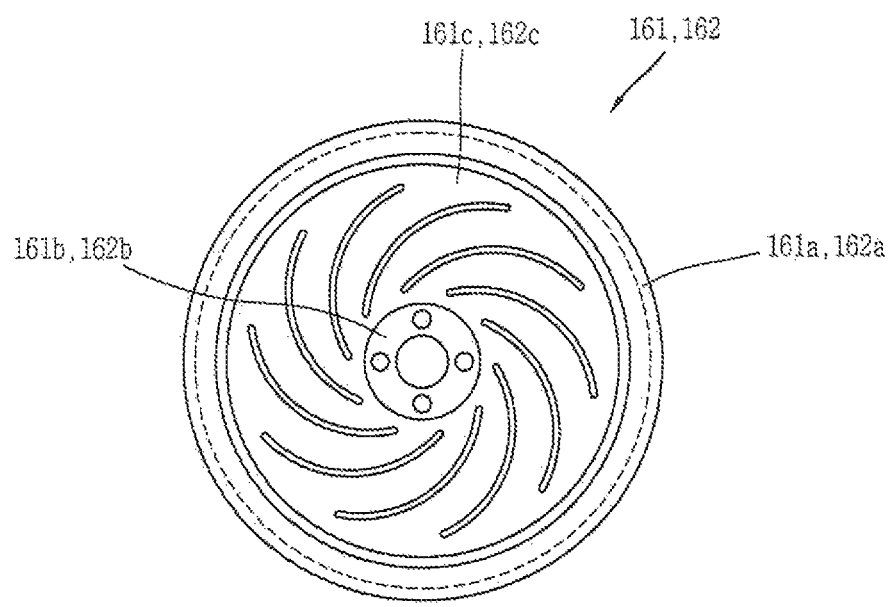
FIG. 6 is a front view illustrating an example of a plate spring applied to the front side support spring and the rear side support spring in FIG. 5.
Figure 7:
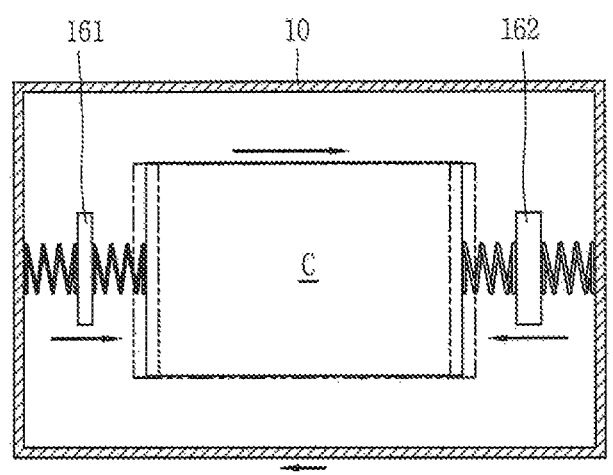
FIG. 7 is a schematic view illustrating vibrations between a compressing unit and support springs in the reciprocating compressor of FIG. 5.

The first support spring 161 and the second support spring 162 may be configured as plate springs as illustrated in FIG. 6.

For example, a first fixed portion 161*a* fixed to the front side of the shell 110 may be formed in the edge of the first support spring 161, and a second fixed portion 161*b* fixed to a front side of the discharge cover 146 may be formed at the center of the first support spring 161. An elastic portion 161*c* cut in a spiral shape may be formed between the first fixed portion 161*a* and the second fixed portion 161*b*.

A first fixed portion 162*a* fixed to a rear side of the shell 110 may be formed in the edge of the second support spring 162, and a second fixed portion 162*b* fixed to the support bracket 153 for supporting the resonance spring 152 may be formed at the center of the second support spring 162. An elastic portion 162*c* cut in a spiral shape may be formed between the first fixed portion 162*a* and the second fixed portion 162*b*.

Meanwhile, step surfaces 111*a* may be formed at both ends of the front and rear of the shell 110 to allow the first support spring 161 and the second support spring 162 to be mounted thereon, respectively.

In a state in which the first support spring 161 is mounted on the front side step surface, a front shell 112 may be mounted on the first support spring 161 and welded so that the body shell 111, the first support spring 161, and the front shell 112 may be welded to be coupled. In a state in which the second support spring 162 is mounted on the rear side step surface, the rear shell 113 may be mounted on the second support spring 161 and welded so that the body shell 111, the second support spring 162, and the rear shell 113 may be welded to be coupled.

In this case, the first support spring 161 and the second support spring 162 are not necessarily limited to plate springs. Namely, the first support spring and the second support spring 162 may be configured as coil springs. Here, however, in the case of the coil springs, when the coil springs are installed in a forward/backward direction, a horizontal directional displacement forming a vertical direction increases, relative to the plate spring, causing the compressing unit to sag considerably, and thus, the coil springs may not be appropriate, relative to the plate spring. Also, in consideration of the sagging of the compressing unit due to the horizontal directional displacement when the coil spring is applied, stiffness may be intended to be increased considerably; in this case, however, a vibration transmission rate may increase, which is, thus, not appropriate.

Reference numeral 101 denotes an internal space, reference numeral 102 denotes a suction pipe, reference numeral 103 denotes a discharge pipe, and reference numeral 145 denotes a valve spring.

The reciprocating compressor according to the present embodiment as described above operates as follows.

Namely, when power is applied to the coil 135 of the reciprocating motor 130, the magnets 132*b* provided in the mover 132 of the motor 130 generate bi-directional induced magnetism together with the coil 135, whereby the mover 132 reciprocate in a forward/backward direction with respect to the stator 131 by the induced magnetism and elastic force of the resonance springs 151 and 152. Then, the piston 142 coupled to the mover 132 reciprocates in the forward/backward direction within the cylinder 141 to suck a refrigerant, compresses the refrigerant, and subsequently discharge the compressed refrigerant to the outside of the compressor.

At this time, the mover 132 of the reciprocating motor 130 reciprocates in a horizontal direction (namely, in a forward/backward direction) with respect to the stator 131 and, at the same time, the piston 142 reciprocates in the horizontal direction with respect to the cylinder 141, generating vibrations in the horizontal direction in the compressing unit C. The vibrations are attenuated by the first support spring 161 and the second support spring 162 that elastically support the compressing unit C with respect to the shell 110, thus reducing overall vibration noise of the compressor.

Figure 1:
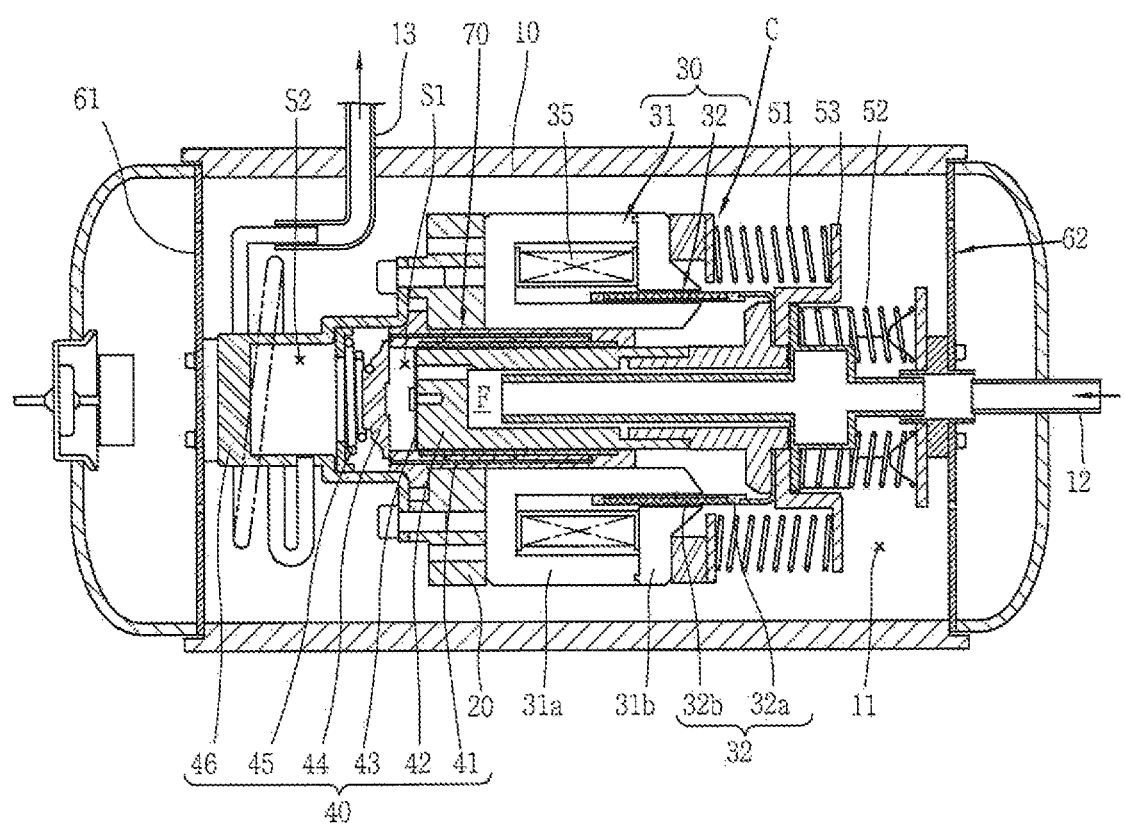
FIG. 1 is a cross-sectional view illustrating an example of the related art reciprocating compressor.
Figure 2:
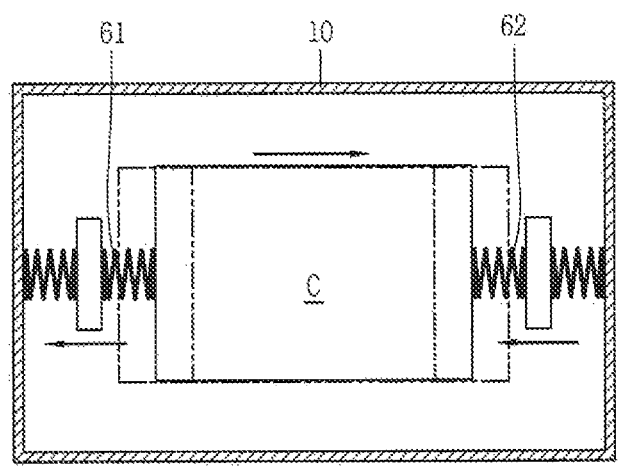
FIG. 2 is a schematic view illustrating vibrations between a compressing unit and support springs in the reciprocating compressor of FIG. 1.
Figure 3:
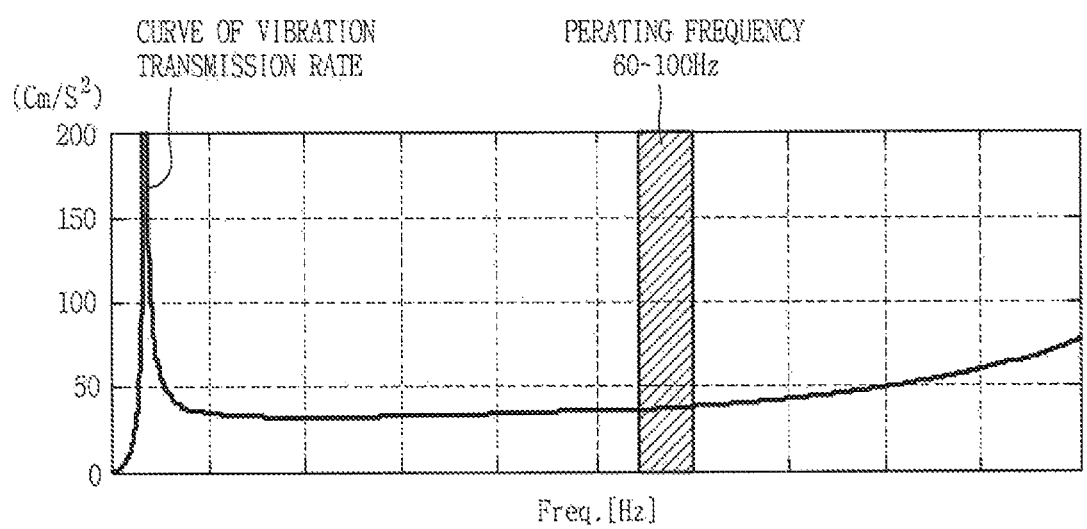
FIG. 3 is a graph illustrating a curve of a vibration transmission rate representing shell vibrations in the related art reciprocating compressor.
Figure 4:
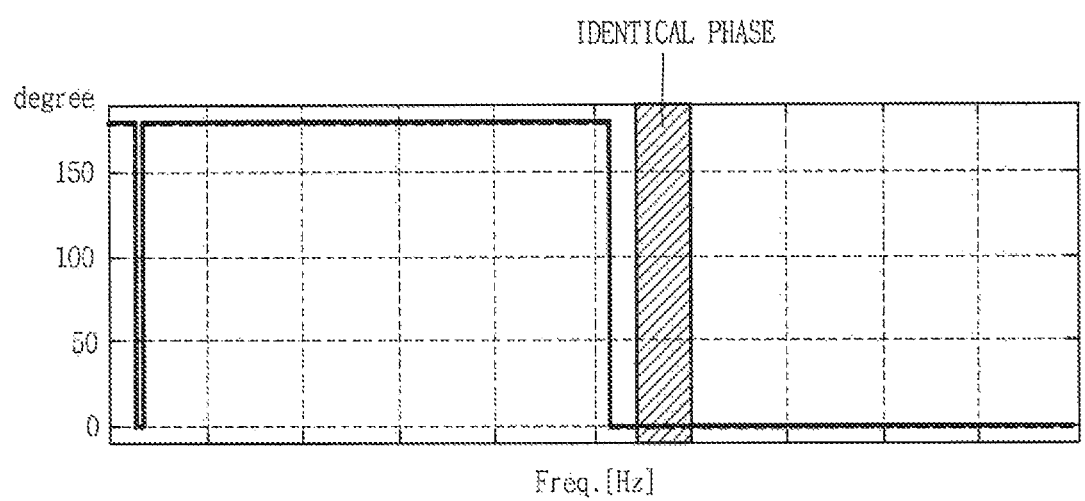
FIG. 4 is a graph illustrating phase angles with respect to a front side support spring and a rear side support spring in FIG. 3.

However, in a case in which the first support spring 161 and the second support spring 162 have an identical natural frequency, a single peak point may be formed and an amplitude in a general operating frequency of 60 to 100 Hz may be approximately 40 cm/s$^2$ as illustrated in FIG. 3. This is because, since the first support spring 161 and the second support spring 162 have an identical natural frequency, a vibration phase (solid line) of the first support spring 161 and a vibration phase (dotted line) of the second support spring 162 form the same phase, resulting in failure to sufficiently generate an attenuation effect, as illustrated in FIG. 4.

Thus, in the present embodiment, the first support spring 161 and the second support spring 162 are formed to have different natural frequencies and, here, the natural frequency ($F_{s1}$) of the first support spring is formed to be greater than the operating frequency ($F_e$) and the natural frequency ($F_2$) of the second support spring is formed to be greater than the operating frequency ($F_e$), whereby the first support spring 161 and the second support spring 162 may resonate in the opposite directions with the compressing unit C interposed therebetween to form a kind of dynamic dampers. Accordingly, since a vibration width of the compressing unit is reduce to be very small, compared with the related art, and thus, vibration noise of the compressor can be attenuated.

Figure 8:
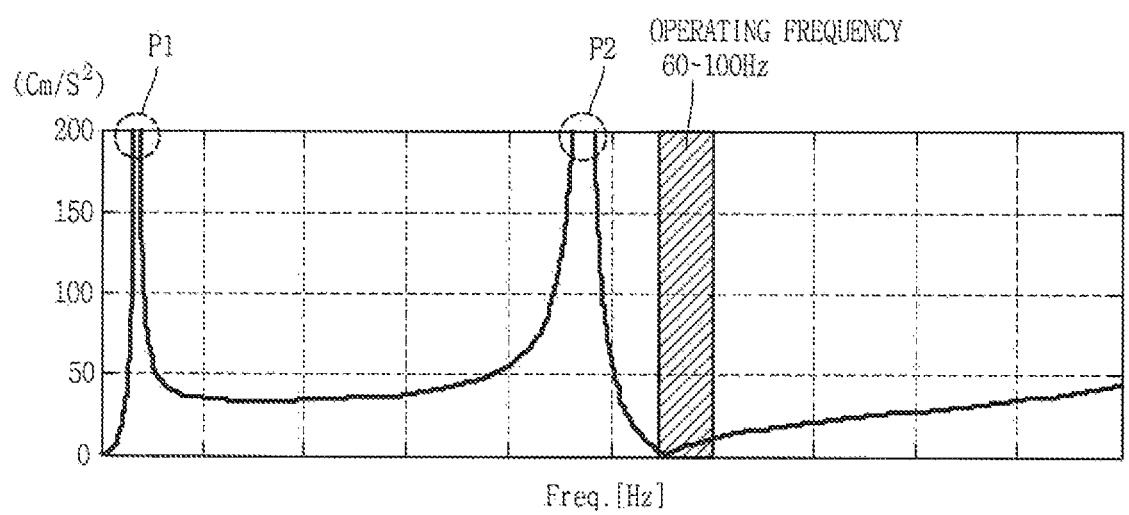
FIG. 8 is a graph illustrating a curve of a vibration transmission rate representing shell vibrations in the reciprocating compressor according to an embodiment of the present disclosure.

For example, as illustrated in FIG. 8, since the natural frequency ($F_{s1}$) of the first support spring and the natural frequency ($F_{s2}$) of the second support spring are different, two peak points P1 and P2 are generated in the curve of a vibration transmission rate. Among the two peak points P1 and P2, one peak point P2 is formed close to the general operating region 60 to 100 Hz, forming a point where the curve of the vibration transmission rate is sharply lowered. Since the point where the curve of the vibration transmission rate is sharply lowered is formed in the vicinity of the general operating region, a vibration transmission rate in the operating region is lowered as much, compared with the related art. In FIG. 8, it can be seen that an amplitude is approximately 0 to 20 cm/s$^2$.

Here, as both peak points P1 and P2 become away from one another within a range in which a resonant mode of the first support spring or the second support spring does not overlap with harmonic of the operating frequency, namely, as the second peak point P2 is formed to be close to the operating frequency region, a vibration transmission rate in the operating frequency region may be lowered as much.

Of course, in a case in which three or more support springs are provided and the support springs are formed to have different natural frequencies, peak points equal to the number of the support springs are generated ahead of or behind the operating region. In this case, however, a vibration transmission rate in the operating region is substantially important, so it may be preferred to design the support springs such that the vibration transmission rate in the operating region is minimized. In particular, unlike a rotary compressor, the reciprocating compressor enters the general operating region as soon as it starts, and thus, the peak point generated in the section from the operation initiation point, namely, from 0 (zero) Hz to the operating region is not significant in relation to vibrations of the compressor. Thus, designing the support springs such that vibrations in the operating region are reduced will be enough.

Figure 9:
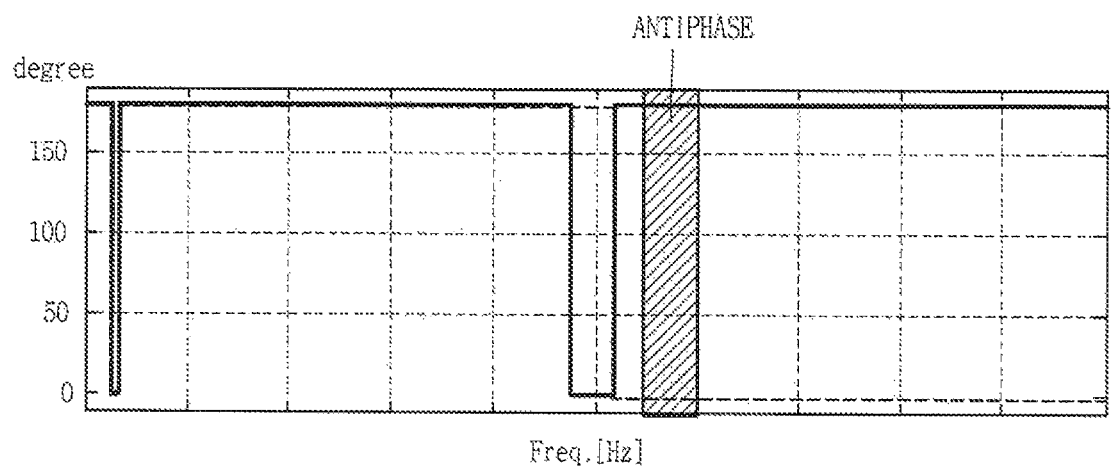
FIG. 9 is a graph illustrating phase angles with respect to the front side support spring and the rear side support spring in FIG. 8.
Figure 10:
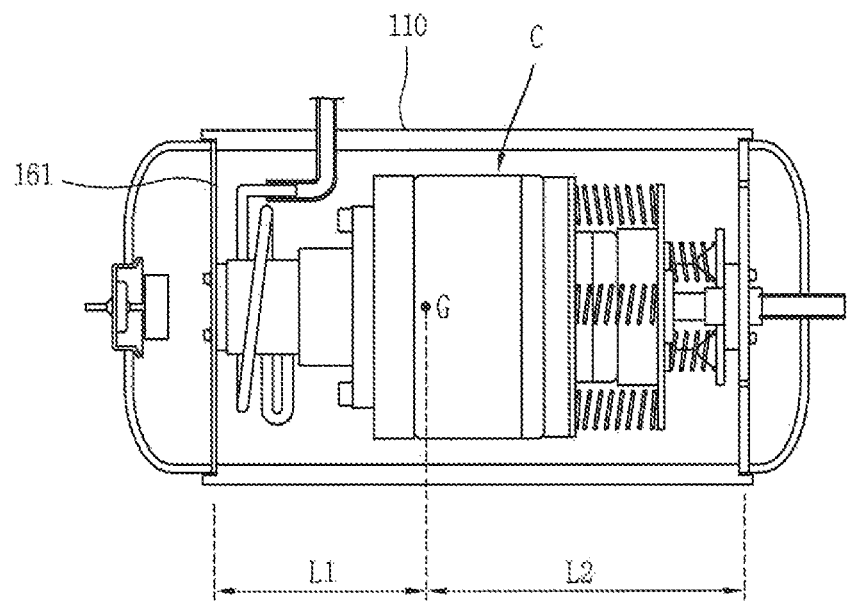
FIG. 10 is a schematic view illustrating an example of setting a natural frequency of both support springs based on the center of gravity of a compressing unit of the reciprocating compressor of FIG. 5.

FIG. 9 is a graph illustrating phase angles of the first and second support springs in a case in which the natural frequency ($F_{s1}$) of the first support spring and the natural frequency ($F_{s2}$) of the second support spring are different and, here, the natural frequency ($F_{s1}$) of the first support spring is formed to be smaller than the operating frequency ($F_e$) of the compressing unit and the natural frequency ($F_{s2}$) of the second support spring is formed to be greater than the operating frequency ($F_e$) of the compressing unit, namely, in a case in which a relational expression $F_{s1} < F_e < F_{s2}$ is satisfied.

As illustrated in FIG. 9, since the natural frequency ($F_{s1}$) of the first support spring is formed to be smaller than the operating frequency ($F_e$) and the natural frequency ($F_{s2}$) of the second support spring is formed to be greater than the operating frequency ($F_e$), it can be seen that phases of the first and second support springs (the solid line represents the phase of the first support spring and the dotted line represents the phase of the second support spring) are opposite, namely, are in antiphase. Accordingly, resonant modes of both springs are canceled out, and thus, vibration noise of the compressor can be reduced as much.

Meanwhile, the first support spring and the second support spring may be installed at the same positions from the center of gravity of the compressing unit, or may be installed at different positions. In a case in which the first support spring 161 and the second support spring 162 are installed at different positions from the center of gravity G, it may be preferred that, among the first support spring 161 and the second support spring 162, a natural frequency of the first support spring 161 installed at a position L1 closer to the center of gravity G of the compressing unit C is formed to be smaller than that of the second support spring 162 installed at a position L2 relatively distant from the center of gravity G.

Also, the first support spring 161 and the second support spring 162 may be disposed to have different natural frequencies based on the compression space S1. For example, although not shown, preferably, a natural frequency of a support spring close to the compression space is formed to be smaller than that of a support spring distant from the compression space.

Also, the first support spring 161 and the second support spring 162 may be formed with an elastic portion having an appropriate shape, thickness, or material, respectively, such that both support springs have different natural frequencies, while having identical stiffness.

Figure 11:
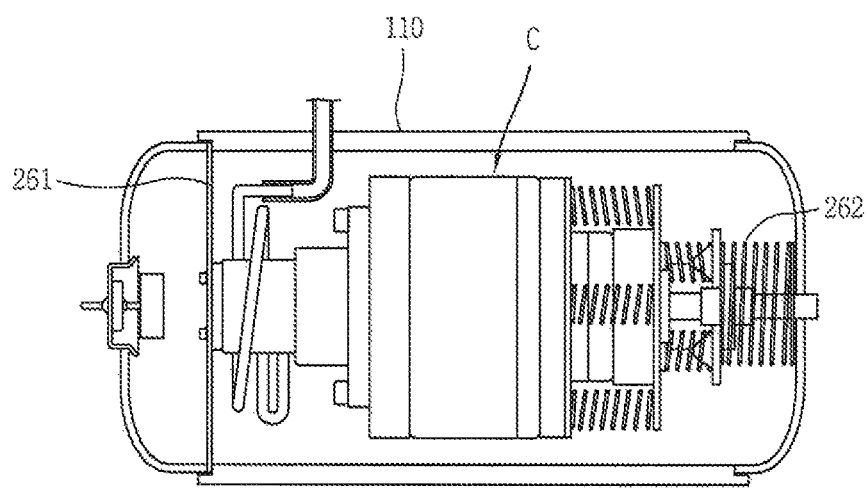
FIG. 11 is a cross-sectional view illustrating another embodiment of the reciprocating compressor of FIG. 5.

Also, in the embodiments described above, the case in which both the first and second support springs are plate springs is described as an example, but the present invention is not limited to the plate spring and the first and second support springs may be configured as coil springs. For example, as illustrated in FIG. 11, the first support spring 261 is configured as a plate spring with small horizontal deformation, while the second support spring 262 may be configured as a compression coil spring with relatively large horizontal deformation. Here, since the center of gravity of the compressing unit C or the compression space is positioned close to the front side, the first support spring 261 positioned in the front side is preferably formed as a plate spring in order to prevent sagging of the compressor at the front side.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A reciprocating compressor, comprising:
    a shell having an internal space;
    a compression device provided in the internal space of the shell, the compression device including a reciprocating motor having a mover that reciprocates, and having a vibration portion that reciprocates together with the mover of the reciprocating motor, and configured to compress a refrigerant as the vibration portion reciprocates in a compression space of a fixed portion; and
    a plurality of support springs configured to support both sides of the compression device in a reciprocating direction with respect to the shell, wherein the plurality of support springs includes a first support spring installed at a first side of the compression device in the reciprocating direction and a second support spring having an identical stiffness to the first support spring and installed at a second side of the compression device in the reciprocating direction, and wherein when a natural frequency of the first support spring is $F_{s1}$, a natural frequency of the second support spring is $F_{s2}$, and an operating frequency of the compression device is $F_e$, a relational expression $F_{s1}<F_e<F_{s2}$ is satisfied such that compressor vibrations are reduced without reducing a stiffness of the first and second support springs, wherein the first and second support springs are each formed with an elastic portion cut in a spiral shape and configured to have a shape, thickness, or material such that the natural frequencies of the first and second support springs are different, but the stiffness is identical.

2. The reciprocating compressor of claim 1, wherein the first support spring and the second support spring have a level of stiffness sufficient to prevent deformation of the compression device by reducing an amplitude of vibration of the compressor.

3. The reciprocating compressor of claim 1, wherein, among the first support spring and the second support spring, the natural frequency of a support spring closer to a center of gravity of the compression device is smaller than the natural frequency of a support spring farther from the center of gravity of the compression device.

4. The reciprocating compressor of claim 1, wherein, among the first support spring and the second support spring, the natural frequency of a support spring closer to the compression space is smaller than the natural frequency of a support spring farther from the compression space.

5. The reciprocating compressor of claim 1, wherein the plurality of support springs is configured as a same type of springs among plate springs and coil springs.

6. The reciprocating compressor of claim 1, wherein, among the plurality of support springs, a spring positioned closer to a center of gravity of the compression device is a plate spring, and a support spring positioned farther from the center of gravity of the compression device is a coil spring.

7. The reciprocating compressor of claim 1, wherein the compression device includes a piston slidably inserted into a cylinder forming the compression space, and a fluid bearing provided at the cylinder and configured to supply a refrigerant discharged from the compression space to a gap between the cylinder and the piston to support the piston with respect to the cylinder.

8. A reciprocating compressor, comprising:
a shell having an internal space;
a compression device provided in the internal space of the shell and configured to reciprocate with a predetermined operating frequency to compress a refrigerant; and
a first support spring and a second support spring having an identical stiffness to the first support spring provided at front and rear portions of the compression device and configured to elastically support the compression device with respect to the shell, with a natural frequency, respectively, wherein a phase of a resonance frequency of the first support spring and a phase of a resonance frequency of the second support spring are opposite at a predetermined range of frequencies, wherein the shell includes a body shell both ends of which are open, a front shell and a rear shell that cover both ends of the body shell, and step surfaces formed on the ends of the body shell, and wherein the front shell and the rear shell are mounted on edges of the first support spring and the second support spring, respectively, the edges of the first and second support springs being mounted in the step surfaces.

9. The reciprocating compressor of claim 8, wherein a resonant mode of the first support spring and a resonant mode of the second support spring do not overlap with a harmonic of the predetermined operating frequency at the predetermined range of frequencies.

10. The reciprocating compressor of claim 8, wherein the first support spring and the second support spring are plate springs.

11. The reciprocating compressor of claim 8, wherein the first support spring is a plate spring and the second support spring is a coil spring.

12. The reciprocating compressor of claim 8, wherein the predetermined operating frequency of the compression device is included in the predetermined range of frequencies in which the phase of the resonance frequency of the first support spring and the phase of the resonance frequency of the second support spring are opposite to each other.

13. The reciprocating compressor of claim 8, wherein a plurality of peak points at which the natural frequencies of the first support spring and the second support spring overlap is formed, and wherein an interval between any one peak point among two peak points and the predetermined operating frequency of the compression device is smaller than an interval between the two peak points.

14. The reciprocating compressor of claim 13, wherein the predetermined operating frequency of the compression device includes a point at which a vibration transmission rate representing vibrations of the shell is lowest.

15. A reciprocating compressor, comprising:
a shell having an internal space;
a compression device provided in the internal space of the shell and configured to reciprocate at a predetermined operating frequency to compress a refrigerant; and
a first support spring and a second support spring having identical stiffness provided at front and rear portions of the compression device and configured to elastically support the compression device with respect to the shell, with a natural frequency, respectively, wherein when the natural frequency of the first support spring is $F_{s1}$, the natural frequency of the second support spring is $F_{s2}$, and the predetermined operating frequency of the compression device is $F_e$, a relational expression $F_{s1}<F_e<F_{s2}$ is satisfied, wherein the shell includes a body shell both ends of which are open, a front shell and a rear shell that cover both ends of the body shell, and step surfaces formed on the ends of the body shell, and wherein the front shell and the rear shell are mounted on edges of the first support spring and the second support spring, respectively, the edges of the first and second support springs being mounted on the step surfaces.

16. The reciprocating compressor of claim 15, wherein the predetermined operating frequency of the compression device is included in a range of frequencies in which a phase of a resonance frequency of the first spring and a phase of a resonance frequency of the second support spring are opposite to each other.

17. The reciprocating compressor of claim 15, wherein a plurality of peak points at which the natural frequencies of the first support spring and the second support spring overlap is formed, and an interval between any one peak point among two peak points and the predetermined operating frequency of the compression device is smaller than an interval between the two peak points.

18. The reciprocating compressor of claim 15, wherein the first support spring is positioned closer to a center of gravity of the compression device than the second support spring.

19. The reciprocating compressor of claim 1, wherein the shell includes a body shell both ends of which are open, a front shell and a rear shell that cover both ends of the body shell, and step surfaces formed on the ends of the body shell, and wherein the front shell and the rear shell are coupled to the step surfaces with the support springs mounted therebetween.

20. The reciprocating compressor of claim 1, further including a spring bracket supporting a resonance spring installed in a movement direction of a piston, wherein the second support spring is fixed to the spring bracket.

21. The reciprocating compressor of claim 1, wherein the elastic portion is provided between a first fixed portion formed in an edge and a second fixed portion formed in a center.

* * * * *